US008050450B2

(12) United States Patent
Miller et al.

(10) Patent No.: US 8,050,450 B2
(45) Date of Patent: Nov. 1, 2011

(54) WATERMARKING DIFFERENT AREAS OF DIGITAL IMAGES WITH DIFFERENT INTENSITIES

(75) Inventors: Marc D. Miller, Corte Madera, CA (US); Donald Haaga, Portland, OR (US); Tony F. Rodriguez, Portland, OR (US)

(73) Assignee: Digimarc Corporation, Beaverton, OR (US)

( * ) Notice: Subject to any disclaimer, the term of this patent is extended or adjusted under 35 U.S.C. 154(b) by 0 days.

(21) Appl. No.: 12/758,600

(22) Filed: Apr. 12, 2010

(65) Prior Publication Data

US 2010/0284563 A1 Nov. 11, 2010

Related U.S. Application Data

(60) Division of application No. 11/295,345, filed on Dec. 5, 2005, now Pat. No. 7,697,716, which is a continuation of application No. 09/649,260, filed on Aug. 28, 2000, now abandoned.

(60) Provisional application No. 60/152,520, filed on Sep. 1, 1999.

(51) Int. Cl.
*G06K 9/00* (2006.01)
(52) U.S. Cl. ........................................ 382/100; 713/176
(58) Field of Classification Search .................. 382/100; 713/176
See application file for complete search history.

(56) References Cited

U.S. PATENT DOCUMENTS

| | | | |
|---|---|---|---|
| 4,231,656 A * | 11/1980 | Dickey et al. ................... 355/71 |
| 4,649,435 A | 3/1987 | Kramer | |
| 5,315,098 A | 5/1994 | Tow | |
| 5,412,742 A * | 5/1995 | Takasaki et al. .............. 382/316 |
| 5,528,740 A | 6/1996 | Hill et al. | |
| 5,530,759 A | 6/1996 | Braudaway et al. | |
| 5,537,223 A | 7/1996 | Curry | |
| 5,613,004 A | 3/1997 | Cooperman | |
| 5,617,119 A | 4/1997 | Briggs et al. | |
| 5,734,752 A | 3/1998 | Knox | |
| 5,790,703 A | 8/1998 | Wang | |
| 5,822,436 A | 10/1998 | Rhoads | |
| 5,825,892 A * | 10/1998 | Braudaway et al. ............ 380/51 |
| 5,862,260 A | 1/1999 | Rhoads | |
| 5,893,101 A | 4/1999 | Balogh et al. | |
| 5,901,178 A | 5/1999 | Lee et al. | |
| 5,905,800 A | 5/1999 | Moskowitz | |
| 5,930,369 A | 7/1999 | Cox | |

(Continued)

FOREIGN PATENT DOCUMENTS

EP 961239 12/1999

(Continued)

OTHER PUBLICATIONS

Huang et al., Adaptive image watermarking scheme based on visual masking, 1998, IEEE Electronic letters.*

(Continued)

*Primary Examiner* — John Strege (57) ABSTRACT

An image is processed to encode a digital watermark, with different regions thereof processed using different levels of watermark intensity. In an image comprised of elements of differing sizes (e.g., halftone shapes of different sizes, or lines of different width), the different regions can be defined by reference to the sizes of elements contained therein. Regions characterized by relatively small elements can be watermarked at a relatively low intensity. Regions characterized by relatively large elements can be watermarked at a relatively high intensity. A variety of other features are also discussed.

16 Claims, 7 Drawing Sheets

U.S. PATENT DOCUMENTS

| | | | |
|---|---|---|---|
| 5,945,103 | A | 8/1999 | Hanada et al. |
| 5,946,414 | A | 8/1999 | Cass et al. |
| 5,951,055 | A | 9/1999 | Mowry, Jr. |
| 6,031,914 | A | 2/2000 | Tewfik et al. |
| 6,122,403 | A | 9/2000 | Rhoads |
| 6,128,411 | A | 10/2000 | Knox |
| 6,141,441 | A | 10/2000 | Cass et al. |
| 6,181,802 | B1 * | 1/2001 | Todd ............................. 382/100 |
| 6,205,249 | B1 | 3/2001 | Moskowitz |
| 6,208,735 | B1 | 3/2001 | Cox et al. |
| 6,208,746 | B1 | 3/2001 | Musgrave |
| 6,222,932 | B1 | 4/2001 | Rao |
| 6,252,971 | B1 | 6/2001 | Wang |
| 6,272,176 | B1 | 8/2001 | Srinivasan |
| 6,272,260 | B1 | 8/2001 | Furukawa et al. |
| 6,281,903 | B1 | 8/2001 | Martin |
| 6,334,187 | B1 | 12/2001 | Kadono |
| 6,370,272 | B1 | 4/2002 | Shimizu |
| 6,384,935 | B1 | 5/2002 | Yamazaki |
| 6,404,908 | B1 * | 6/2002 | Schneider et al. ............ 382/132 |
| 6,449,377 | B1 * | 9/2002 | Rhoads ......................... 382/100 |
| 6,556,688 | B1 | 4/2003 | Ratnakar |
| 6,603,576 | B1 | 8/2003 | Nakamura |
| 6,631,198 | B1 | 10/2003 | Hannigan et al. |
| 6,633,654 | B2 | 10/2003 | Hannigan et al. |
| 6,778,678 | B1 | 8/2004 | Podilchuk |
| 6,856,429 | B1 | 2/2005 | Noguchi |
| 2001/0030769 | A1 | 10/2001 | Jacobs |
| 2001/0052076 | A1 | 12/2001 | Kadono |
| 2002/0054356 | A1 | 5/2002 | Kurita et al. |

FOREIGN PATENT DOCUMENTS

| | | |
|---|---|---|
| GB | 2346110 | 1/2000 |
| WO | WO9743736 | 11/1997 |

OTHER PUBLICATIONS

Huang, et al., "Adaptive image watermarking scheme based on visual masking," IEEE Electonic Letters, Apr. 1998, vol. 34, Issue 8, pp. 748-750.

Bender, "Application for Data Hiding", IBM Systems Journal, vol. 39, No. 3.4, 2000, pp. 547-568.

IBM DataHiding Proposal, Version 1.0, Sep. 1997.

Kankanhalli, Content Based Watermarking of Images, Proceedings of the sixth ACM international conference on Multimedia, 1998.

Kutter, "Watermarking resisting to translation, rotation, and scaling," Proc. SPIE vol. 3528: Multimedia Systems and Applications, pp. 423-431, Nov. 1998.

Meng, Embedding Visible Video Watermarks in the Compressed Domain, Proc. IEEE Int. Conference in Image Processing, 1998.

Podilchuk et al., "Adaptive Watermarking Using Visual Models," IEEE Journal on Selected Areas in Communications, 16(4), May 1998.

Cox, et al., "Secure Spread Spectrum Watermarking for Multimedia," IEEE Trans. Image Process., 1997, 6, (12), pp. 1673-1687.

* cited by examiner

WATERMARKING DIFFERENT AREAS OF DIGITAL IMAGES WITH DIFFERENT INTENSITIES

RELATED APPLICATION DATA

This application is a division of application Ser. No. 11/295,345, filed Dec. 5, 2005, now U.S. Pat. No. 7,697,716, which is a continuation of application Ser. No. 09/649,260, filed Aug. 28, 2000, now abandoned, which is a non-provisional of application 60/152,520, filed Sep. 1, 1999.

TECHNICAL FIELD

The present technology relates to steganography, and more particularly to techniques for watermarking digital images.

BACKGROUND AND SUMMARY

The technology for watermarking digital images is well developed. The intensity of the watermark determines both if the watermark will create visual artifacts and how easily the watermark will be to detect after an image has been printed, copied or otherwise transformed. When inserting a digital watermark into an image, it is desirable to utilize a high intensity watermark signal, that is, to change the intensity of the pixels in the image as much as possible so that it will be easy to detect and read the watermark. However, if the intensity of the watermark signal is too high, the watermark may create visual artifacts in the image, that is, the watermark signal may be visually evident.

Many watermarking technique are "perceptually adaptive." Perceptually adaptive watermarking techniques take into account the characteristics of an image in an effort to make a watermark relatively easy to detect and to avoid causing visually apparent artifacts in the watermarked image.

A perceptually adaptive watermarking technique is for example shown in U.S. Pat. No. 5,748,763 entitled "Image Steganography System Featuring Perceptually Adaptive and Globally Scalable Signal Embedding" by Geoffrey B. Rhoads. Certain commercially available image editing programs (such as the image edition program marketed by Adobe Corporation under the trademark "Adobe Photoshop") can watermark digital images using perceptually adaptive techniques.

The technology detailed herein concerns watermarking an image using the highest practical watermark intensity that can be used without creating visual artifacts. An image is divided into areas. Each area only contains portions of the image where it is appropriate to use a watermark signal having the same energy level.

Some images consist of a series of lines. Such images are often used as the background image on security documents or currency. If an image consists of a series of lines, the technology described herein can be applied by dividing the image into areas where the lines that form the image are within a certain range of widths. An appropriate watermark intensity is then determined for each such area and a watermark of this intensity is applied to the image. Watermarks can be applied to such images using the line width modulation techniques shown in U.S. application Ser. No. 09/074,034, filed May 6, 1998 (now U.S. Pat. No. 6,449,377) which corresponds PCT/US99/08252; and Ser. No. 09/127,502, filed Jul. 31, 1998 (now U.S. Pat. No. 6,345,104) which corresponds to PCT/US99/14532.

If an image is a grayscale image, areas having the same tonal value or tonal density are determined directly, or the image is transformed into a line art image and areas with the same size binary valued areas (lines, dots, squares, etc.) are selected by filtering the image.

After the image has been divided areas which have a line width or tonal density value that is within a certain range of values, an appropriate watermark energy level is assigned to each area. The image is watermarked by changing the value of each bit or pixel in the image by an amount determined by both the value in a payload tile and the intensity value associated with the area in which the bit or pixel lies.

The described technology is applicable to watermarking techniques which change the value of a binary parameter in areas of an image (for example, by modulating the width of lines in a line image) or to watermarking techniques which change the value of a multi-valued parameter in areas of the image (for example, by changing the luminance value of the pixels in an image).

DETAILED DESCRIPTION OF A PREFERRED EMBODIMENT

In a first preferred embodiment, the technology is applied to an image which consists of a series of lines. Images which consist of a series of lines are, for example, often found as background imagery on security documents and on currency. A digital watermark can be inserted into such an image using line width modulation techniques such as those shown in co-pending U.S. patent application Ser. No. 09/074,034, filed May 6, 1998 (now U.S. Pat. No. 6,449,377) which corresponds PCT/US99/08252, and Ser. No. 09/127,502, filed Jul. 31, 1998 (now U.S. Pat. No. 6,345,104) which corresponds to PCT/US99/14532. The disclosures of the above referenced patent applications is incorporated herein in their entireties A typical image which consists of a series of lines will have a relatively complex set of lines; however for ease of explanation the technology will herein be described as applied to a very simple image. This technology can be applied to complex images in exactly the same was as described herein as applied to a simple image.

Figure 1:
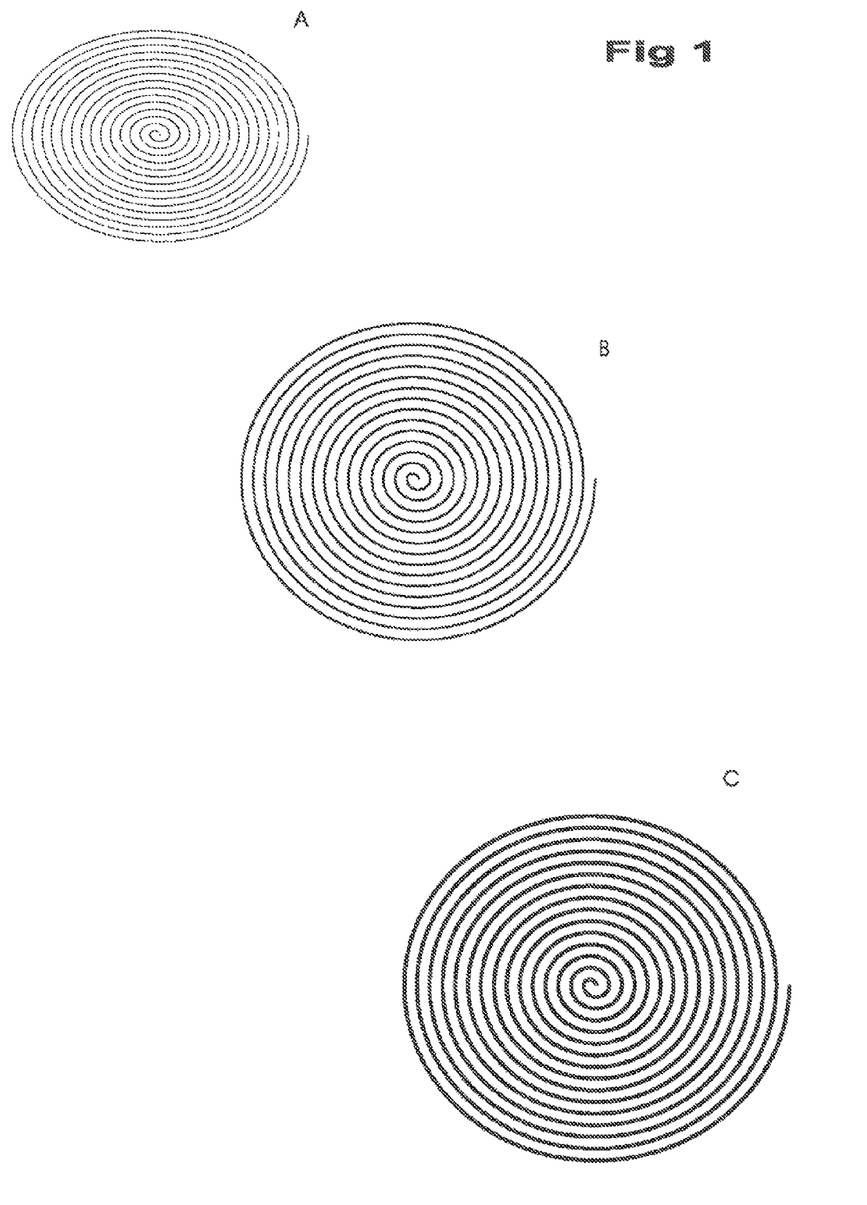
FIG. 1 shows three areas each of which have lines of different width.

FIG. 1 shows three areas designated A, B, and C. Each of the areas A, B, and C has lines with a width that differs from the width of the lines in the other areas. The lines in area A are relatively narrow, the lines in area C are relatively wide, and the lines in area B have an intermediate width. Area C can absorb much more watermarking energy than can area A without creating any visual artifacts.

For ease of reference the line width in the three areas (in terms of pixels and resolution) will hereinafter be referred to by line width index numbers as follows:

Area A—0.5
Area B—1.0
Area C—2.0

The actual width of the lines in terms of pitch or pixel width will depend upon the specific application. For example, an index number of 1.0 could for example correlate to a pitch of 2. The relative width of the lines and this relative width can be most easily represented in a general manner by using index numbers.

Figure 2:
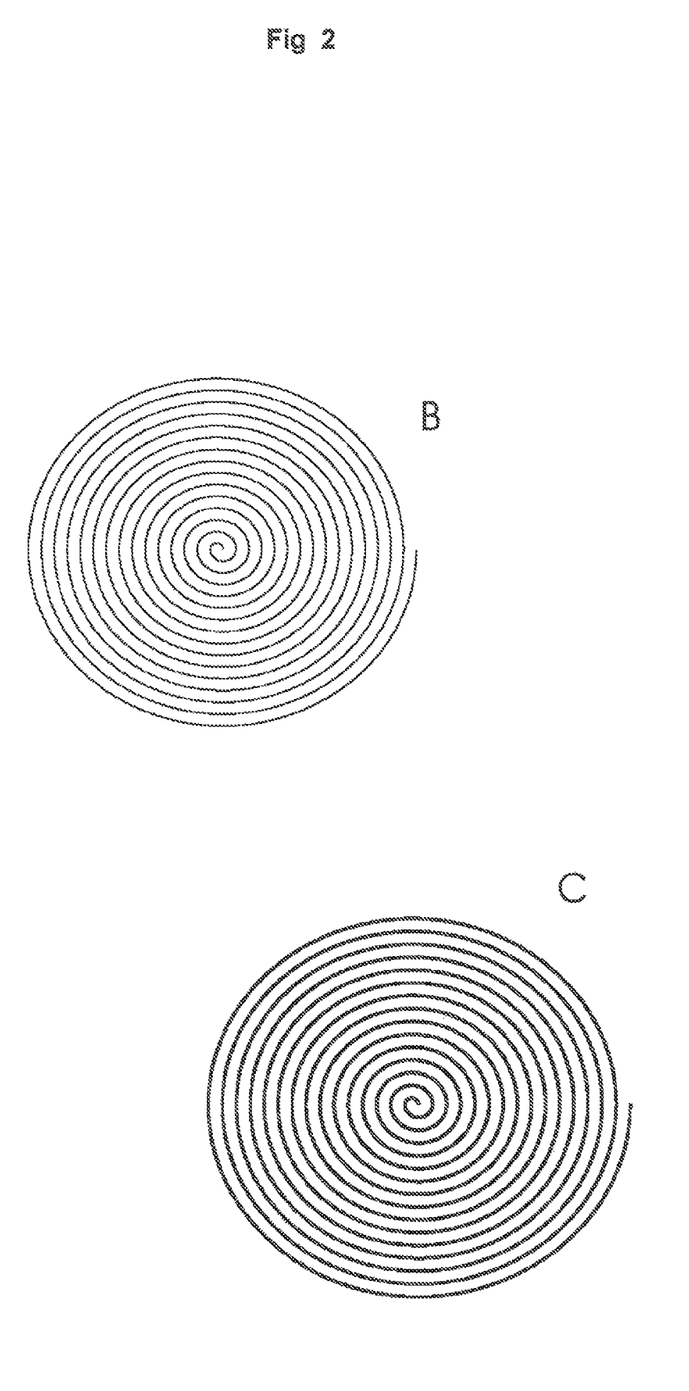
FIG. 2 shows an image after a mask has been applied

Many commercially available image editing programs (such as, for example, Adobe Photoshop) include the ability to make image filters, and masks. For example, using such programs an image can be filtered to eliminate all lines that have (in terms of the above line width index values) a width of less than 1.0. If such a filter is applied to the image shown in FIG. 1, area A would be eliminated, resulting in an image such as that shown in FIG. 2 which only has areas B and C. The image in FIG. 2 could then be subtracted from the image shown in FIG. 1 to produce an image (or mask) that only includes the image in area A. Next the image could be filtered to remove all lines with a line width index of less than 2.0. The result would be an image with only area C. The image with area C could be subtracted from the image with areas B and C to produce an image with only area B. One would thus have three images (or masks) each of which include lines with a particular line width index, that is, each of which specify an area which should be watermarked at a particular intensity.

It is desirable to watermark the three areas in the original image (each of which is defined by a different mask) with the maximum watermark energy without creating visual artifacts. The three masks described above can be used to control the watermarking operation as described below.

Figure 3:
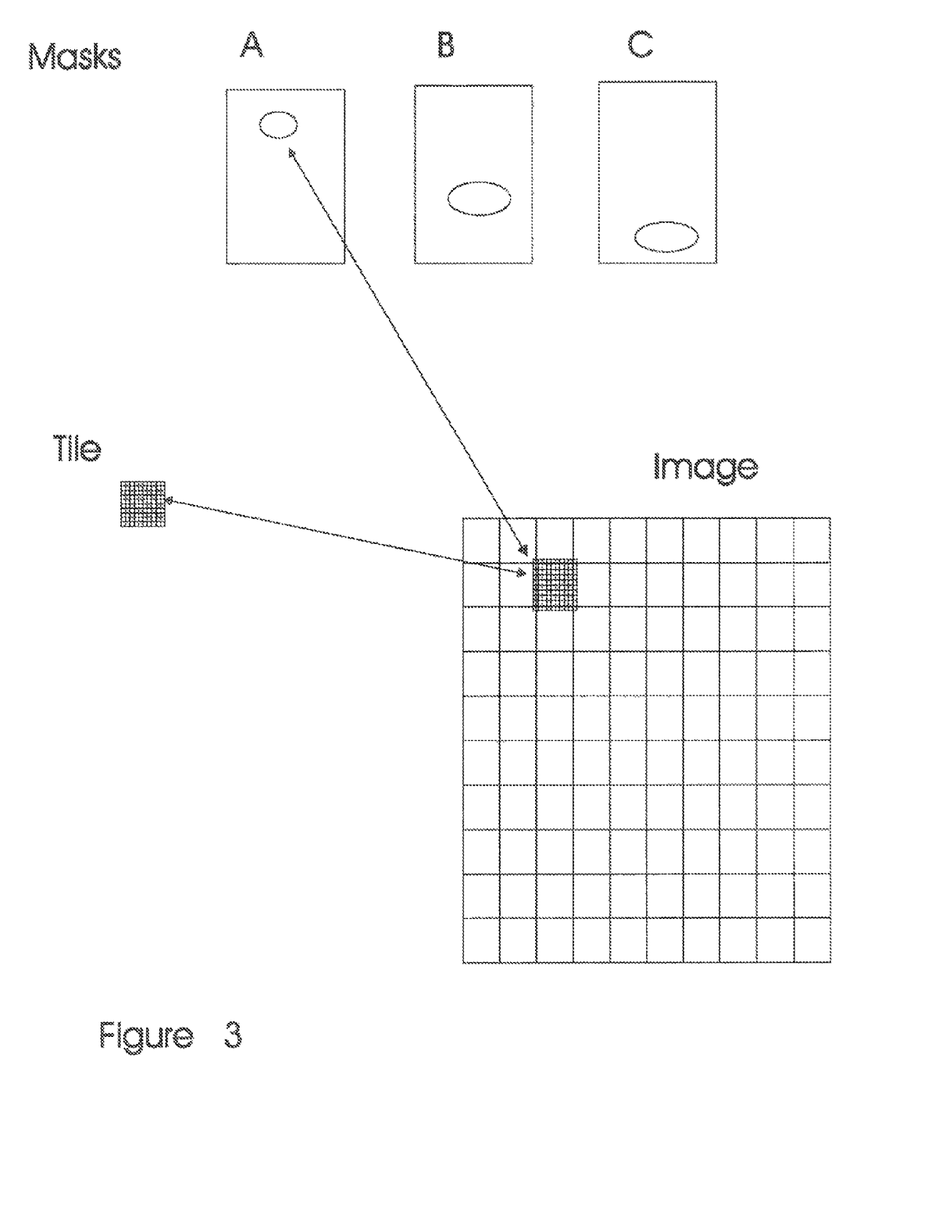
FIG. 3 shows an image divided into a grid.

As is conventional, in order to achieve reliability the image is divided into a grid as shown in FIG. 3. Each square in the grid will be x pixels on each side and thus each square will consist of $x^2$ pixels. The watermark data is inserted into each of the squares on the grid.

The watermark data (termed the payload) is specified by a payload tile. The payload tile defines an amount of change for each pixel in the tile. The size of the tile is the same size as the size of the squares in the grid on the image, that is, in the example given the payload tile will have $x^2$ pixels. The tile specifies a relative amount of change for each pixel in a square on the image that will result in a particular watermark payload. The value of the changes specified by the payload tile are calculated using watermarking techniques such as those described in the previously referenced patent and patent applications. In prior watermarking techniques the pixels in each square of the grid on the image are changed in accordance with the amounts specified in the payload tile in order to watermark the image.

However, with this technology, when changing the pixels in the image in accordance with the payload tile, an additional intensity factor can be taken into account. For example, in a particular square on the grid, the pixels in the square may only be changed by one half of the amount specified in the payload tile. In another square on the grid, the pixels may be changed by seventy five percent of the amounts specified in the payload tile. That is, a watermark can be inserted into the image by changing each pixel in the image by an amount specified by an associated pixel in a payload tile, as modified by an intensity factor. The intensity factor for each pixel in the image is specified using the previously described masks which define an appropriate intensity for different areas of the image.

The watermarking operation proceeds as shown in FIG. 3. Each pixel in each square of the image is changed by an amount which depends both on the value specified for the corresponding pixel in the payload tile and by an intensity value. The intensity value is determined by looking at a series of masks. Each mask specifies a particular intensity. If the mask has an image at the location of the corresponding pixel, the intensity associated with that mask will control the intensity of the change.

The masks are ordered (with the mask specifying areas with the least intensity first) and if two masks have images at the same location, the first mask in the series controls the intensity of the pixels. The payload tile includes a value for each pixel in a square on the image. Each pixel in each square of the image is changed by an amount that depends both on the value specified by the associated pixel in the payload tile and by the various masks that define areas of the image to be watermarked at various intensities. The intensity that should be associated with a mask for an area having a particular width index can be determined by trial and error. However, once determined this value can be used for subsequent operations. That is, the shape of the masks for different images will vary according to the characteristics of the image. The intensity value assigned to a mask which represents an area having a particular width index can be the same for different images.

Figure 4:
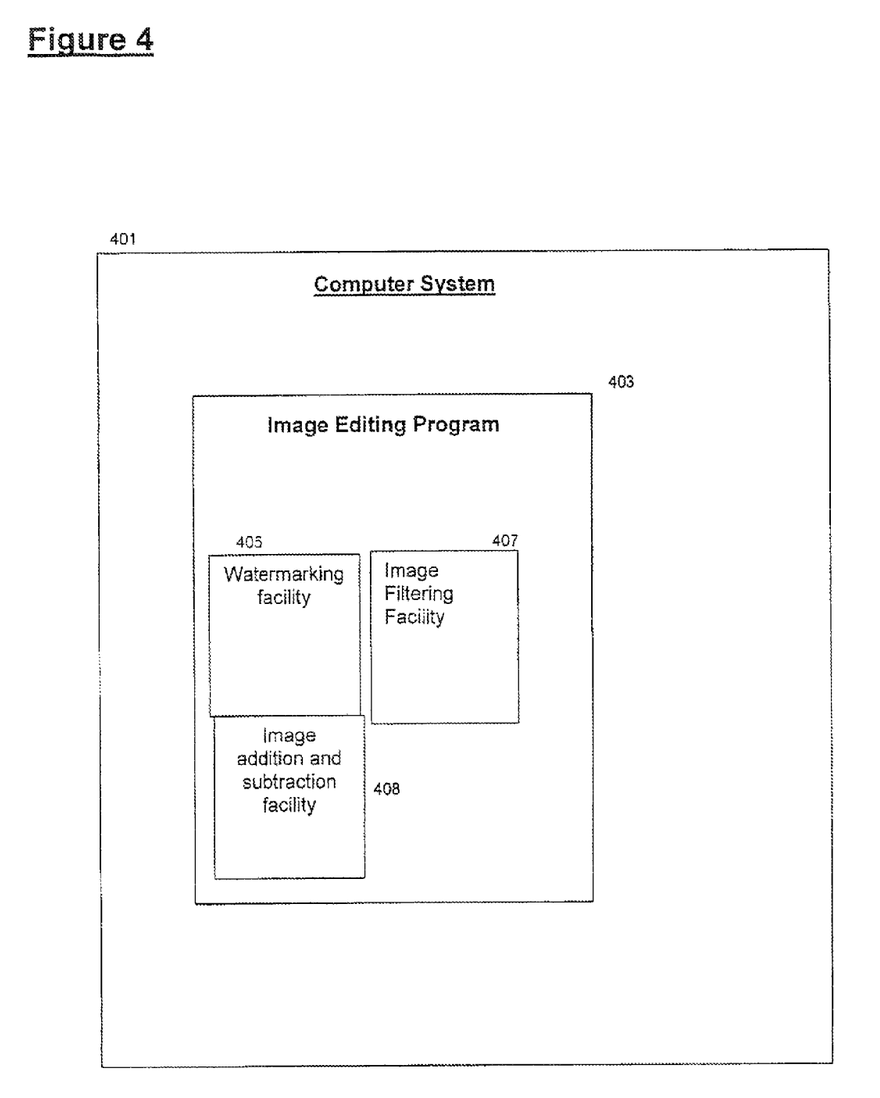
FIG. 4 shows a computer with the programs used to practice one embodiment of the present technology.

A system for performing the above described operations is shown in FIG. 4. The system includes a conventional personal computer system 401. This can for example be an Intel Pentium III system operating under the Microsoft Windows operating system. The computer system 401 includes conventional I-O devices such as a display, a keyboard, a printer, etc., conventional storage devices such as RAM, hard drive, CD drive etc. Such conventional components are not shown in FIG. 4.

The system includes an image editing program 403 such as for example the Adobe Photoshop image editing program. The image editing program 403 includes an image watermarking facility 405, an image filtering facility 407, and an image addition and subtraction facility 408. Except for the details described herein, the image editing program 403, the watermarking facility 405, the filtering facility 407, and the image addition and subtraction facility 408 are conventional components.

Figure 5:
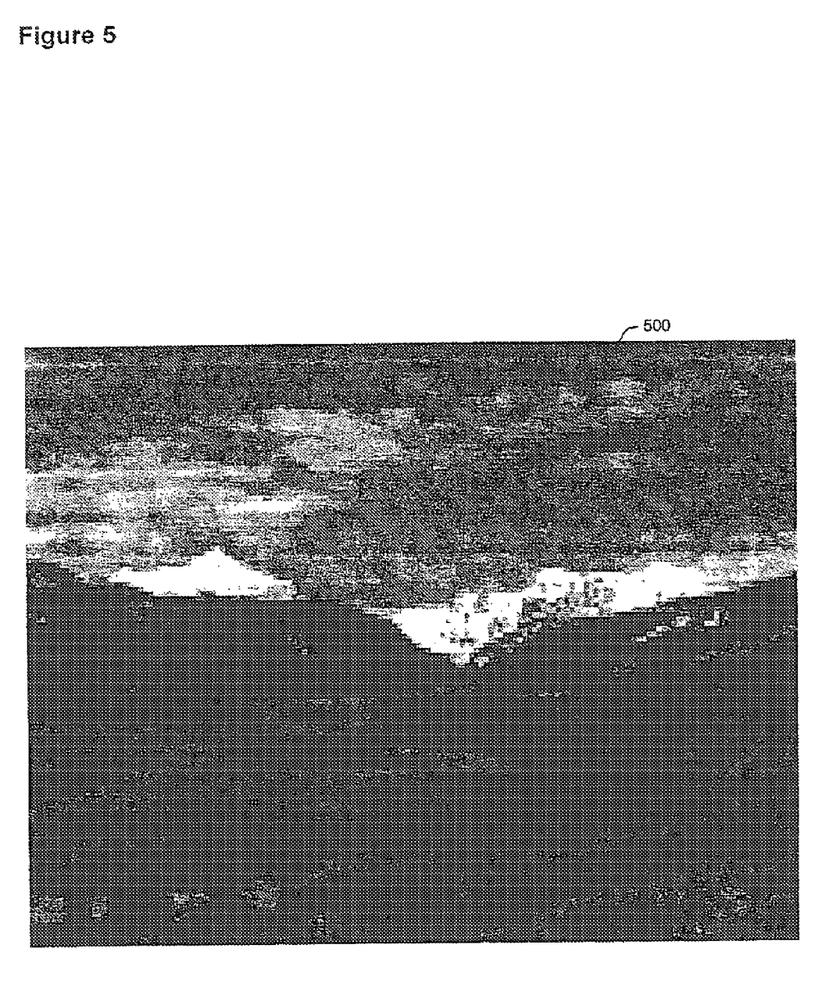
FIG. 5 is an example of a gray scale image.

The embodiment described above applied a watermark to an image that consisted of a series of lines with different width. The embodiment described below applies the technology to a halftone image such as that shown in FIG. 5. The half tone image shown in FIG. 5 is a conventional halftone image. It can, for example, be a single color channel of a multicolor image.

Figure 6:
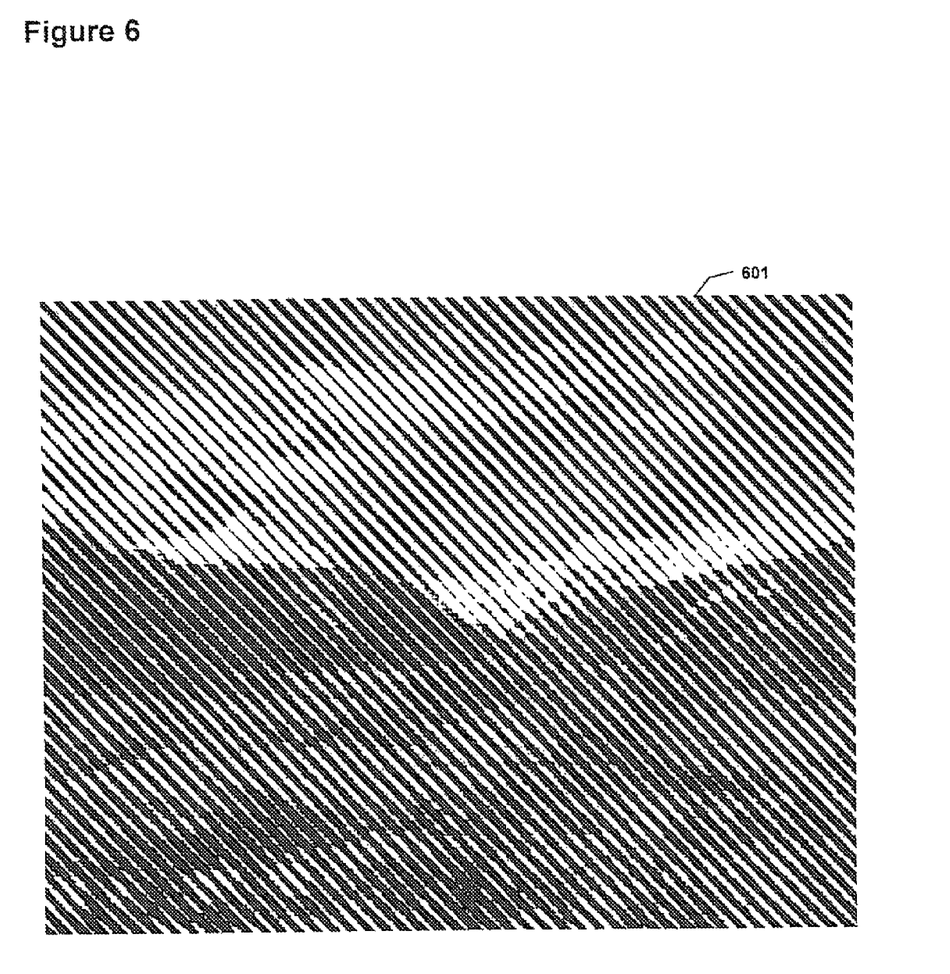
FIG. 6 is an example of a line art image where the binary elements are lines.

Halftone images, such as image 500 shown in FIG. 5, can be transformed into line art images such as line art image 601 shown in FIG. 6. This conversion can be done by conventional, well knows processes regularly used in the printing industry. After a halftone image such as image 500 shown in FIG. 5 is converted to a line art image such as image 601 shown in FIG. 6, the technology can be applied as previously explained with respect to the first embodiment. That is, image 601 shown in FIG. 6 can be divided into areas, each of which has lines the width of which falls in a particular range. This can be done as previously explained by applying line width filters and subtracting from the original image to form a series of masks, each of which define an area with lines whose width fall within a selected or specified range.

After the areas with lines of similar width are defined as described above, the image is watermarked. As in the first embodiment, the intensity at each location in the image is defined by both the payload tile and the masks which define the area having line width in a specified range.

The line art image 601 shown in FIG. 6 appears as a series of lines. As is well known in the printing art, the elements in a line art image need not be lines. The elements in the line art image can be circles as in image 701 shown in FIG. 7. The particular shape of the elements is generally selected for various esthetic reasons and the present technology can be used with elements having any desired shape. The filtering to define areas having the same tonal density would proceed as previously described irrespective of the shape of the elements in the line art image.

Figure 7:
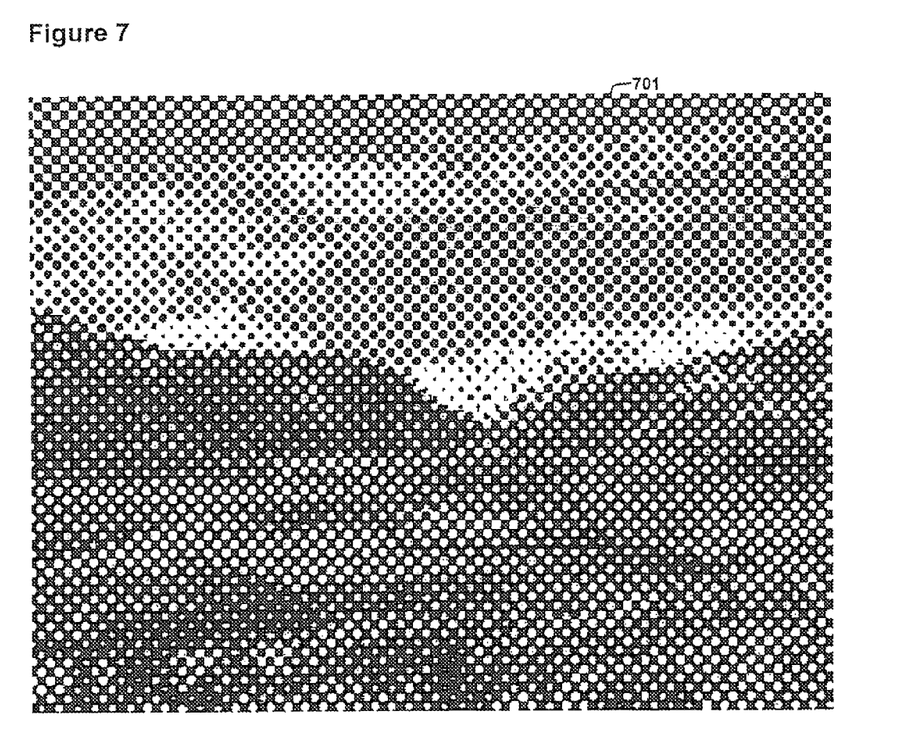
FIG. 7 is an example of a line art image where the binary elements are circles.

It should be understood that the images shown in FIGS. 5, 6 and 7 are merely representative of gray scale images. The present technology can be applied to gray scale images developed with any of the processes known in the printing industry.

Digital images consist of an array of bits or pixels. With the present technology, the bits or pixels in an image are divided in two ways. First the bits or pixels of an image are divided into arrays the size of a watermark payload tile as is conventional. Second the pixels of the image are divided into what can be termed secondary control areas.

The first division of the pixels or bits is into areas that are identical in size. That is, the first division divides the pixels into areas each of which is the size of the payload tile. The payload tile specifies the change in each bit or pixel in an area the size of said payload tile. The amount specified by the values in said payload tile is the amount which is appropriate for the watermark to carry the desired payload data. The values in the payload tile can be established and used on a perceptually adaptive basis.

The secondary control areas are not necessarily identical in size. Furthermore, the size of the secondary control areas is not related to the size of the watermark tile. The secondary control areas are areas of the image which have some particular characteristic. For example they are areas of the image which have lines within a specified width range or areas which have tonal density values within a specified range.

Each secondary control area has an associated control value. For example the control value associated with each secondary control area can be the intensity of the watermark which is appropriate for the particular area.

The embodiments described herein give specific and novel techniques for dividing an image into secondary control areas. It should however, be understood that various other and different techniques can be utilized to define secondary control area for a document.

While our technology has been illustrated above with respect to various embodiments, it will be appreciated by those skilled in the art that that the scope thereof exceeds the specific embodiments described herein. Various other changes in form and detail can be made without departing from the sprit and scope of our inventive work.

We claim:

1. A method of watermarking a digital image to embed a plural-bit watermark specified by a payload tile, said image comprising an two-dimensional array of elements spanning a first area, said payload tile comprising plural values spanning a two-dimensional second area smaller than the first area, said method comprising the acts:

defining a first contiguous region and a second contiguous region, the first region corresponding to a portion of said image where a characteristic of said image falls within a first range, the second region corresponding to a portion of said image where said characteristic of said image falls within a second range different than the first range, the first region having a first control value associated therewith, and the second region having a second control value associated therewith that is different than the first control value, the first and second regions having different sizes;

changing the value of the image elements in the first region in accordance with the payload tile values and the first control value, and changing the value of the image elements in the second region in accordance with said payload tile values and the second control value;

wherein the same payload tile values encode the same plural-bit watermark in both the first and second regions, but change the image by differing amounts in said regions depending on the control values for said regions.

2. The method recited in claim 1 wherein said characteristic comprises width of lines in said image.

3. The method recited in claim 1 wherein said first control value comprises an intensity of said watermark.

4. A method of applying a digital watermark to an image comprising the acts of defining a first region of the image having a tonal value within a first pre-established range, defining a second region of the image having a tonal value within a second pre-established range that is different than the first, the first and second regions being of different sizes, and applying to both the first and second regions the same plural-bit watermark payload, but applying said plural-bit watermark payload at a first intensity in the first region, and applying said plural-bit watermark payload at a second intensity different than the first intensity in the second region.

5. A method of watermarking a half tone image comprising the acts of converting said half tone image into a line art image, filtering said line art image to create a series of masks defining areas of said half tone image having tonal density within a specified range, each range of tonal densities having an appropriate watermark intensity, watermarking said halftone image, the intensity of the watermark in each area being set to said appropriate intensity.

6. A method of watermarking a digital line art image comprising the acts of determining a first region of said image having lines within a first size range, determining a second region of said image having lines within a second size range different than the first, applying a digital watermark representing plural bits to said first region of the image at a first intensity, and applying a digital watermark representing said plural bits to said second region of the image at a second intensity different than the first, wherein the same plural-bits are encoded in different regions at different intensities due to different size ranges of lines therein.

7. A method of watermarking a line art image comprising the acts of determining areas of said image having lines within at least two different size ranges, and applying a digital watermark to said image, the intensity of said digital watermark in each area being dependent on the range of line size therein.

8. The method recited in claim 7 wherein said watermark is applied by modulating the width of said lines.

9. The method recited in claim 7 wherein said determining act is performed by filtering said image.

10. The method recited in claim 1 wherein said image comprises a line art image and said characteristic of said image comprises the size of the lines in said image.

11. The method recited in claim 1 wherein said characteristic comprises a tone of said image.

12. The method recited in claim 1 wherein said image comprises a series of lines and wherein said characteristic comprises a width of said lines, and wherein said first control value comprises an intensity of said watermark.

13. The method recited in claim 12 wherein said image is watermarked by line width modulation.

14. In a method of digitally watermarking a two-dimensional image by changing aspects thereof to steganographically convey a plural-bit payload, the image comprising a pattern of elements to be printed or displayed, an improvement comprising:

defining a payload tile, the payload tile identifying a relative amount of change to be applied to a payload tile-sized portion of the image so that said payload tile-sized portion of the image conveys the plural-bit payload;

defining a first intensity factor that is additionally to be used in changing elements in a first region of said image;

additionally defining a second, different, intensity factor that is additionally to be used in changing elements in a second region of said image;

changing a first portion of the image in accordance with said payload tile and the first intensity favor, the first portion having a size larger than the payload tile; and changing a second portion of the image in accordance with said payload tile and the second intensity favor, the second portion having a size larger than the payload tile.

15. The method of claim 14 in which the payload tile comprises a two-dimensional tile pattern, which is repeated across the image.

16. A system for watermarking a line art image comprising:

means for determining areas of said image having lines within specific size ranges; and means for applying a watermark to said image, the intensity of said watermark in each area being established at a selected value;

wherein the means for applying a watermark comprises means for applying the watermark at a first intensity in a first determined area characterized by having lines within a first specific size range, said means also for applying said watermark at a second intensity different than the first, in a second determined area characterized by having lines within a second specific size range different than the first specific size range.

* * * * *